US007286821B2

(12) United States Patent
Kraft et al.

(10) Patent No.: US 7,286,821 B2
(45) Date of Patent: Oct. 23, 2007

(54) COMMUNICATION TERMINAL HAVING PERSONALISATION MEANS

(75) Inventors: Christian Kraft, Hvidovre (DK); Keijo Virtanen, Tampere (FI); Toraj Khadjenoori, Vanloese (DK)

(73) Assignee: Nokia Corporation, Espoo (FI)

(*) Notice: Subject to any disclaimer, the term of this patent is extended or adjusted under 35 U.S.C. 154(b) by 110 days.

(21) Appl. No.: 09/984,608

(22) Filed: Oct. 30, 2001

(65) Prior Publication Data
US 2003/0083050 A1 May 1, 2003

(51) Int. Cl.
*H04M 3/42* (2006.01)

(52) U.S. Cl. ............... 455/415; 455/566; 455/576; 379/88.19; 379/93.01

(58) Field of Classification Search ........... 455/414.1, 455/415, 556.2, 412.2, 566; 379/142.06, 379/93.17
See application file for complete search history.

(56) References Cited

U.S. PATENT DOCUMENTS

| 5,305,097 | A | | 4/1994 | Sato et al. | |
| 5,835,569 | A | * | 11/1998 | Ajiro | 379/88.11 |
| 5,875,239 | A | * | 2/1999 | Koralewski et al. | 379/142.15 |
| 5,889,852 | A | * | 3/1999 | Rosecrans et al. | 379/355.05 |
| 6,061,578 | A | * | 5/2000 | Yoh | 455/573 |
| 6,192,116 | B1 | * | 2/2001 | Mayak | 379/142.08 |
| 6,366,651 | B1 | * | 4/2002 | Griffith et al. | 379/88.14 |
| 6,553,106 | B1 | * | 4/2003 | Gould et al. | 379/93.17 |
| 6,567,671 | B2 | * | 5/2003 | Amin | 455/415 |
| 6,675,008 | B1 | * | 1/2004 | Paik et al. | 455/415 |
| 2002/0018553 | A1 | | 2/2002 | Pernu et al. | |
| 2002/0039914 | A1 | * | 4/2002 | Hama et al. | 455/566 |
| 2003/0032413 | A1 | * | 2/2003 | Aksu et al. | 455/415 |

FOREIGN PATENT DOCUMENTS

| EP | 0 436 345 A2 | 7/1991 |
| WO | WO 96/27974 | 9/1996 |
| WO | WO 99/25107 | 5/1999 |
| WO | WO 00/21267 | 4/2000 |
| WO | WO 00/33584 | 6/2000 |

OTHER PUBLICATIONS

WO 99/25107, May 20, 1999, Call Set UP in Mobile Systems by Frank et al.*

* cited by examiner

*Primary Examiner*—Fan Tsang
*Assistant Examiner*—Simon Sing
(74) *Attorney, Agent, or Firm*—Banner & Witcoff, Ltd.

(57) ABSTRACT

In the development of mobile communication there is a trend towards more personalized ways of communication and forms of expression. By using a User-to-User Signalling (UUS) supplementary service that allows a served subscriber to send/receive a limited amount of subscriber generated information to/from another user in association with a call and working parallel to the normal communication channel, personalized items can be transferred during call set-up and during call. Examples of what kind of personalization items are text messages, picture messages, animations or ringing tones.

16 Claims, 12 Drawing Sheets

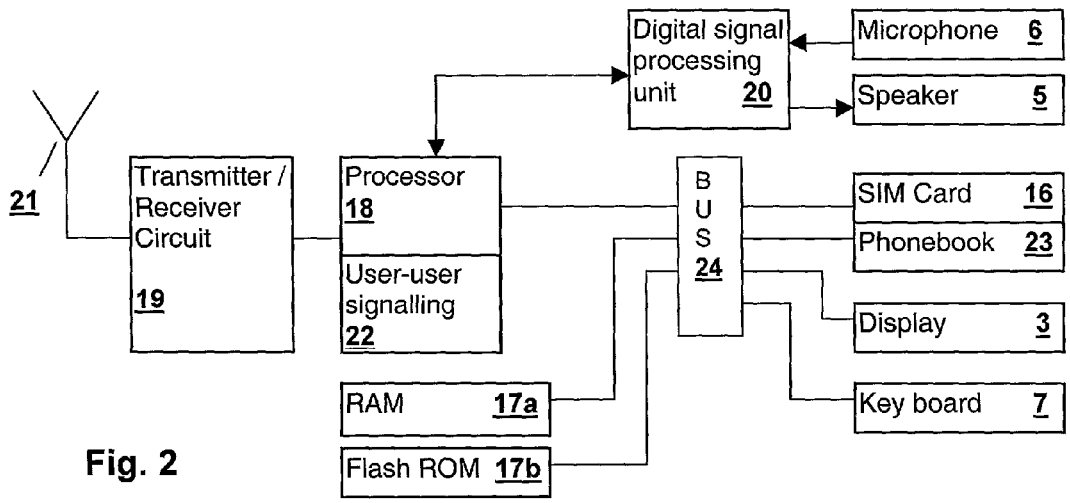
Fig. 2
| 8 | 7 | 6 | 5 | 4 | 3 | 2 | 1 | Octet |
|---|---|---|---|---|---|---|---|---|
| User-user | | | | | | | | |
| 0 | 1 | 1 | 1 | 1 | 1 | 1 | 0 | 1 |
| Information element identifier | | | | | | | | |
| Length of user-user content | | | | | | | | 2 |
| Protecol discriminator | | | | | | | | 3 |
| User information | | | | | | | | 4 etc |
User-user information element
Fig. 3
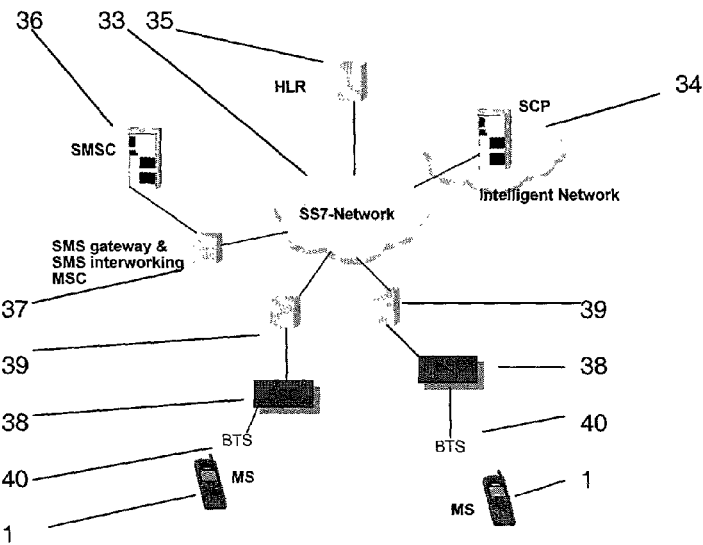
Fig. 4

COMMUNICATION TERMINAL HAVING PERSONALISATION MEANS

BACKGROUND OF THE INVENTION

1. Field of the Invention

The invention relates to a communication terminal provided which transfers personalisation items during call set up and during a call. The personalisation items are used to make a called person aware of something or just to make the call more personalised.

2. Description of Prior Art

In the development of mobile communication there is a trend towards more personalised ways of communication and expression forms. An exampled of this is the short message service (SMS), chat, picture messaging, animations, ringing tunes, operator logos, vibrations, exchangeable covers and picture holders for personal pictures. Users have however found out that there are some limitations with these features, and have been looking for something more advanced.

According to the GSM 02.87 specification it is specified a User-to-User Signalling (UUS) supplementary service allows the served subscriber to send/receive a limited amount of subscriber generated information to/from another user in association with a call to the user. The User-to-User Signalling (UUS) channel works in parallel with the speech channel during e.g. call set-up that can be used for communication. The served subscriber can send and receive User-to-User-Information (UUI) in different phases of the call depending on the service(s) to which the subscriber subscribes.

SUMMARY OF THE INVENTION

The invention provides a communication terminal having means for transferring a personalised item from one communication terminal to another communication terminal.

The invention provides a communication terminal or mobile phone that uses UUS as a means for transferring different personalisation items.

The invention is a method for enabling further personalised communication means between the user of communication terminals before starting a speech call.

A first preferred embodiment of the invention is a method for transferring personalised items between two communication terminals during call set up with each other where the transferred personalised items are received by the second communication terminal during call set up mode, displaying a note about the transferred items in the second communication terminal.

The invention is also a method for enabling further personalised communication means between a user of communication terminals during a speech call between the communication terminals.

A second preferred embodiment of the invention is a method for transferring personalised items between two communication terminals during calls with each other where the transferred personalised items are received by the second communication terminal during calling mode, displaying a note about the transferred items in the second communication terminal.

A third object of the invention is to provide a communication terminal having means for enabling further personalised communication between users of communication terminals.

According to a third preferred embodiment of the claimed invention this objective is obtained by a communication terminal handling information transferred from a calling communication terminal, and comprising a processor identifying the transferred information where the processor, upon detecting a transferred information, analyzes the character of the transferred information, displays a note about the transferred information in the communication terminal display, where the processor temporarily stores the transferred information and where the processor provides means for the user to handle the transferred information.

BRIEF DESCRIPTION OF THE DRAWING

The invention will be explained more fully below, by way of example, in connection with preferred embodiments and with reference to the drawing, in which:

FIG. 2 schematically shows the essential parts of a telephone for communication with a cellular network.

FIG. 3 shows an example of a User-to-user-signalling element for transferring information to the calling party handled according to a preferred embodiment of the invention.

FIG. 4 shows the basic elements of a network in which the invention may be carried out.

DETAILED DESCRIPTION OF THE INVENTION

Figure 1:
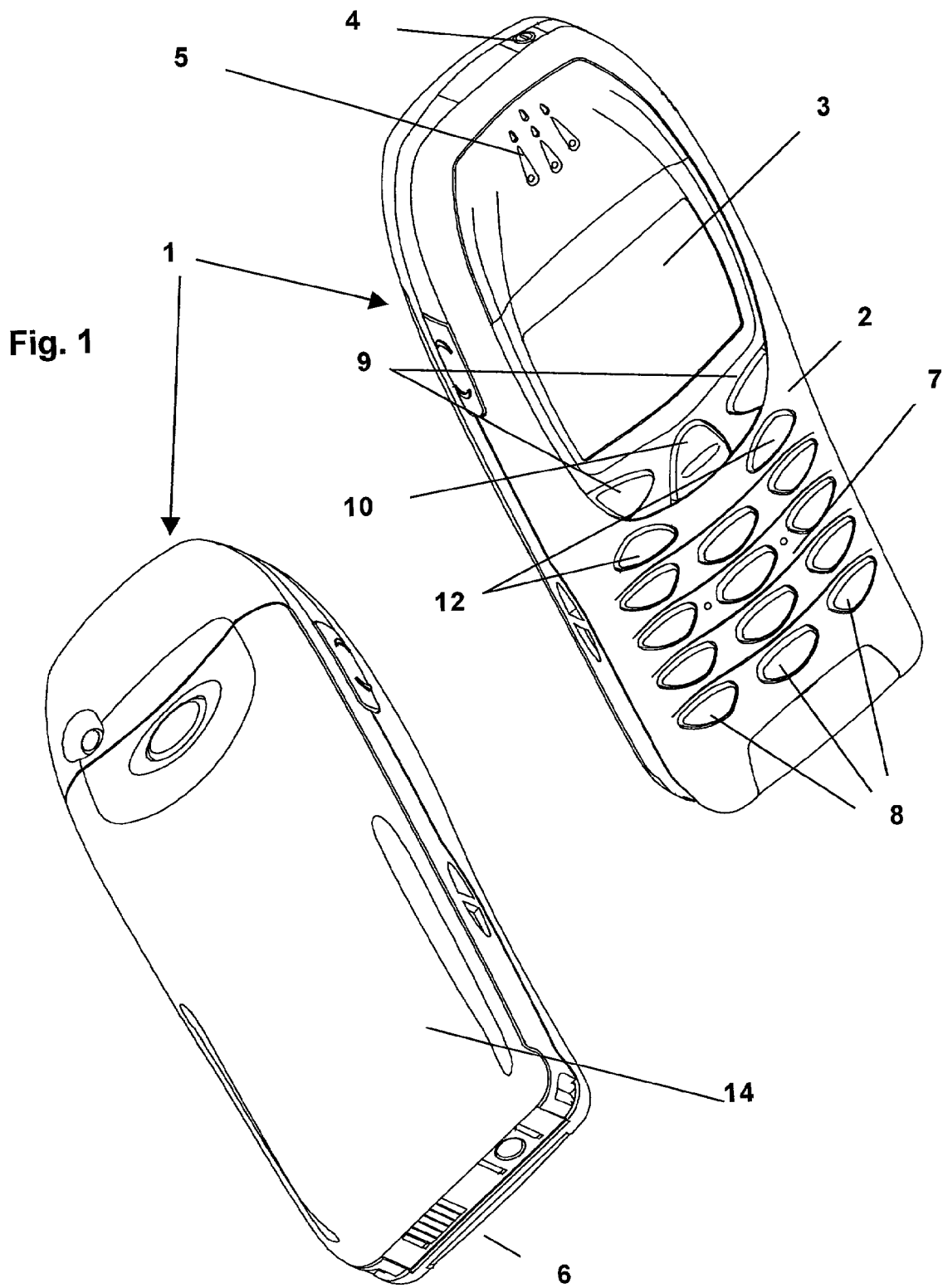
FIG. 1 shows in a perspective view a known embodiment of a communication terminal.

According to a first aspect of the personalisation items transferred during call set up and during a call in a communication terminal according to the invention will be described with reference to a hand portable phone, preferably a cellular/mobile phone. An embodiment of this phone is shown in FIG. 1, where a cellular/mobile phone 1 is shown in perspective. As will be seen, the phone is provided with a front cover 2 having a window frame 3 encircling the protection window of the display assembly 3. The cellular/mobile phone comprises a user interface having an on/off button 4, a speaker 5 (only openings are shown), a keypad 7, a battery 14, a display/LCD 3 and a microphone 6 (only openings are shown).

The keypad 7 has a first group of alphanumeric keys, by means of which the user can enter a telephone number, write a text message (SMS), write a name (associated with the phone number), etc. Each of the twelve alphanumeric keys 8 is provided with a figure "0-9" or a sign "#" or "*", respectively. In alpha mode each key is associated with a number of letters and special signs used in the text editing.

The keypad 7 additionally comprises two menu selections or soft-keys 9, two call handling keys 12, and a navigation-key 10. The functionality of the soft-key depends on the state of the phone and the navigation in the menu by using a navigation-key. The present functionality of the menu selection keys 9 is shown in separate fields in the display 3 just above the keys 9. The two call handling keys 12 are used for establishing a call or a conference call, terminating a call or rejecting an incoming call. This key layout is characteristic of e.g. the Nokia 6210™ phone.

The navigation-key 10 is an up/down key and is placed centrally on the front surface of the phone between the display 3 and the group of alphanumeric keys 8. Hereby the user will be able to control this key with his thumb. This is the best site to place an input key requiring precise motor movements. Many experienced phone users are used to one-hand handling. They place the phone in the hand between the fingertips and the palm of the hand. Thereby the thumb is free for inputting information.

FIG. 2 schematically shows the most important parts of a preferred embodiment of the phone/terminal, the parts being essential to the understanding of the invention. The microphone 6 records the user's speech, and the analog signals formed thereby are A/D converted in an A/D converter (not shown) before the speech is encoded in an audio part 20. The encoded speech signal is transferred to a processor 18 (physical layer processor), which e.g. supports GSM terminal software. The processor 18 also forms the interface to the peripheral terminals of the apparatus, including RAM and ROM memories 17a and 17b, a SIM card 16, the display 3 and the keypad 7 (from FIG. 1) as well as data, power supply, etc. The processor 18 controls the communication with the network via the transmitter/receiver circuit 19 and an antenna 21. The audio part 20 speech-decodes the signal, which is transferred from the processor 18 to the speaker 5 via a D/A converter (not shown).

The processor 18 is connected via a bus 24 to a RAM memory 17a and a Flash ROM memory 17b, a SIM card 16, the display 3 and the keypad 7 (as well as data, power supply, etc.). A phonebook 23 is furthermore connected to the processor 18 via the bus 24. The phonebook 23 may be stored on the SIM card 16, and/or in the Flash ROM memory 17a.

In the preferred embodiment according to the invention a User-to-user signalling unit 22 is controlled by the processor 18 and provides User-to-user signalling in a UUS channel according to the GSM specification in parallel with the speech channel during e.g. call set-up.

According to the definition of the GSM 02.87 specification, the User-to-user Signalling (UUS) supplementary service allows the served subscriber to send/receive a limited amount of subscriber generated information to/from another user in association with a call to the user. This information shall be passed transparently (i.e. without modification of contents) through the network. Normally, the network shall not interpret or act upon this information.

The served subscriber can send and receive User-to-user-Information (UUI) in different phases of the call depending on the service(s) to which the subscriber subscribes.

These services according to the GSM specification allow the User-to-user-Information to be sent and received during the origination and termination of a call, with User-to-User-Information embedded within call control messages. The service can be activated implicitly by inserting User-to-User-Information when setting up a call or explicitly with an appropriate procedure.

Alternatively, the User-to-User-Information can be sent and received after the served subscriber has received an indication that the remote party is being informed of the call and prior to the establishment of the connection. User-to-User-Information sent by the served subscriber prior to receiving the acceptance of the call by the remote party, may as a network option be delivered to the remote party after the call has been established.

Finally, the User-to-User-Information can be sent and received only while the connection is established.

Preferably, the User-to-User-Information service shall allow the transmission of User-to-User-Information with the maximum length of 128 octets per message.

The User-to-User Signalling supplementary service can be delivered only when both subscribers are GSM PLMN/ISDN subscribers or when a non-ISDN network provides a means of conveying the User-to-User-Information.

Some networks may support the transmission of User-to-User-Information with a maximum length of only 32 octets per message for service 1. In the interworking case only the first 32 octets of User-to-User-Information in a User-to-User-Information with more than 32 octets per message shall be transferred. No notification about the limitation of the User-to-User-Information shall be given to any subscriber.

GSM networks may support the User-to-User Signalling service implicitly requested with 32 octets.

The network option to allow forwarding of User-to-User Signalling requests and User-to-User-Information only if the forwarding subscriber has the subscription of the relevant User-to-User Signalling service is not supported. The general principle of Completion of Calls to Busy Subscriber supplementary service to retain all information of the original call set-up and reusing this information for the Completion of Calls to Busy Subscriber supplementary service call shall also be valid for the User-to-User Signalling supplementary service. Therefore the User-to-User-Information contained in the original call set-up shall be stored in the network and reused in the Completion of Calls to Busy Subscriber supplementary service call.

The formal definition of the component types to encode these operations and errors is provided in the UUS supplementary service specification.

The message structure for the messages used in the UUS supplementary service is described below. The general definition of the message structure and the key to the interpretation can be found in ETSI EN 300 403-1.

A User-to user information element is to convey information between the users. This information is not interpreted by the network, but is carried transparently and delivered to the receiving user. This information may be called a User-to user information element as shown in FIG. 3. Byte 8 in the first octet of the User-to user information element is a 0, and the remaining 7 bytes are used as an identifier of the information element. The second octet defines the length of User-to user contents. The third octet includes a protocol discriminator that specifies the protocol of the message being transferred, while the fourth and further octets define a user information field including the user information sent.

There are no restrictions on the contents of the user information field. In addition to the user information message, the User-to user information element can be included in the set-up, alerting, connect, disconnect, progress, release and release complete messages.

According to a preferred embodiment of the invention for handling user information, transfer is explained with reference to FIG. 4. An SS7 Network 33 is a CCITT specified network interconnecting the individual parts of the system, and the SS7 Network 33 is connected to a Service Control Point 34 (SCP) in a so-called Intelligent Network (IN) containing billing information for cellular phones, a Home Location Register 35 (HLR) containing a database including relevant subscriber information for the provision of the telecommunication service, and a SMS gateway & SMS interworking Mobile Switching Center (MSC) 37 for routing a message towards a Mobile Station (the phone 1). A Short Message Service Center 36 (SMSC) and an SMS gateway & SMS interworking Mobile Switching Center (MSC) 37 handles and routes the SMS's between the SMSC 36 and the SS7 Network 33.

From the SS7 Network 33, the call (in parallel with the UUS channel) is routed towards the Mobile Station 1 via a Mobile Switching Center (MSC) 39, and a Base Station Processor 38 (BSC). A Base Transceiver Station (BTS) 40 establishes the air connection towards the Mobile Station 1.

The preferred embodiment of the communication terminal of the invention is adapted for use in connection with a GSM network, but, of course, the invention may also be applied in connection with other communication terminal networks. It could be cellular networks, various forms of cordless communication terminal systems or in dual band communication terminals accessing sets of these systems/ networks.

The processor 18 is connected to the user interface of the mobile phone. Thus, it is the processor 18, which monitors the activity in the phone and controls the display 3 in response thereto.

Therefore, it is the processor 18, which detects the occurrence of a state change event and changes the state of the phone and thus the display text. The user may cause a state change event, when he/she activates the keypad 7 including the menu selection key or keys 9, and these types of events are called entry events or user events. However, the network communicating with the communication terminal may also cause a state change event. These types of events and other events beyond the users control are called non-user events. Non user events comprise status change during call set-up, change in battery voltage, change in antenna conditions, message on reception of SMS, etc.

Figure 13:
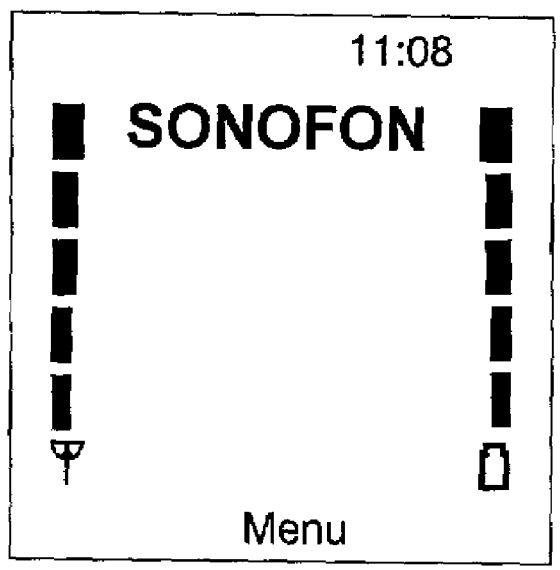
FIG. 13 shows the idle mode display of communication terminals having a different number of soft-keys.
Figure 13:
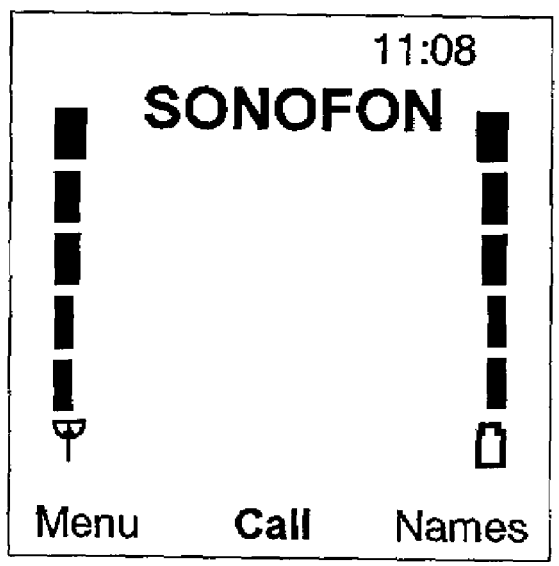

The functionality of handling personalisation items in a communication terminal is basically included in the menu structure and will be explained in connection with the menu structure. The starting point in each embodiment is that the communication terminal is in idle mode, which means that the communication terminal is turned on and ready to be used for any possible operation. The idle mode display will differ from embodiment to embodiment depending on the number of soft-keys 9 that are used in each embodiment. In the illustrated embodiments the communication terminal has two soft-keys, but it is obvious that communication terminals having one, three or more soft-keys can also be provided with the functionality of handling personalisation items according to the invention. In FIG. 13 idle mode displays of communication terminals having different number of soft-keys are shown. The other displays (not shown) of the communication terminal having a different number of soft-keys will also be changed accordingly to suite the inventive concept.

Different embodiments of the invention will be described with reference to FIGS. 5-12 showing displays and flow charts of a communication terminal provided with the functionality of handling personalisation items. First, the operational settings of the invention is described, whereafter operation of the invention is described.

The operational settings of the personalisation items functionality can be adjusted either as general settings for all calls and all different operational modes, but can also be selected differently for the different operational modes. An operational mode also called a profile is a group of settings, e.g. way of alert, kind of ringing tone, ringing volume or message alert, that are adjusted to suit a certain environment or preferences. Examples of this could be normal use of the communication terminal, being at a dinner where normal alert preferably is avoided and only vibra-alert is used, attending a meeting where beep alert could be used, connecting a head-set to the communication terminal while on the move or being in a very noisy environment and having the loudspeaker turned on volume full. By selecting a certain mode or profile all these characteristics can easily be changed.

Figure 5A:
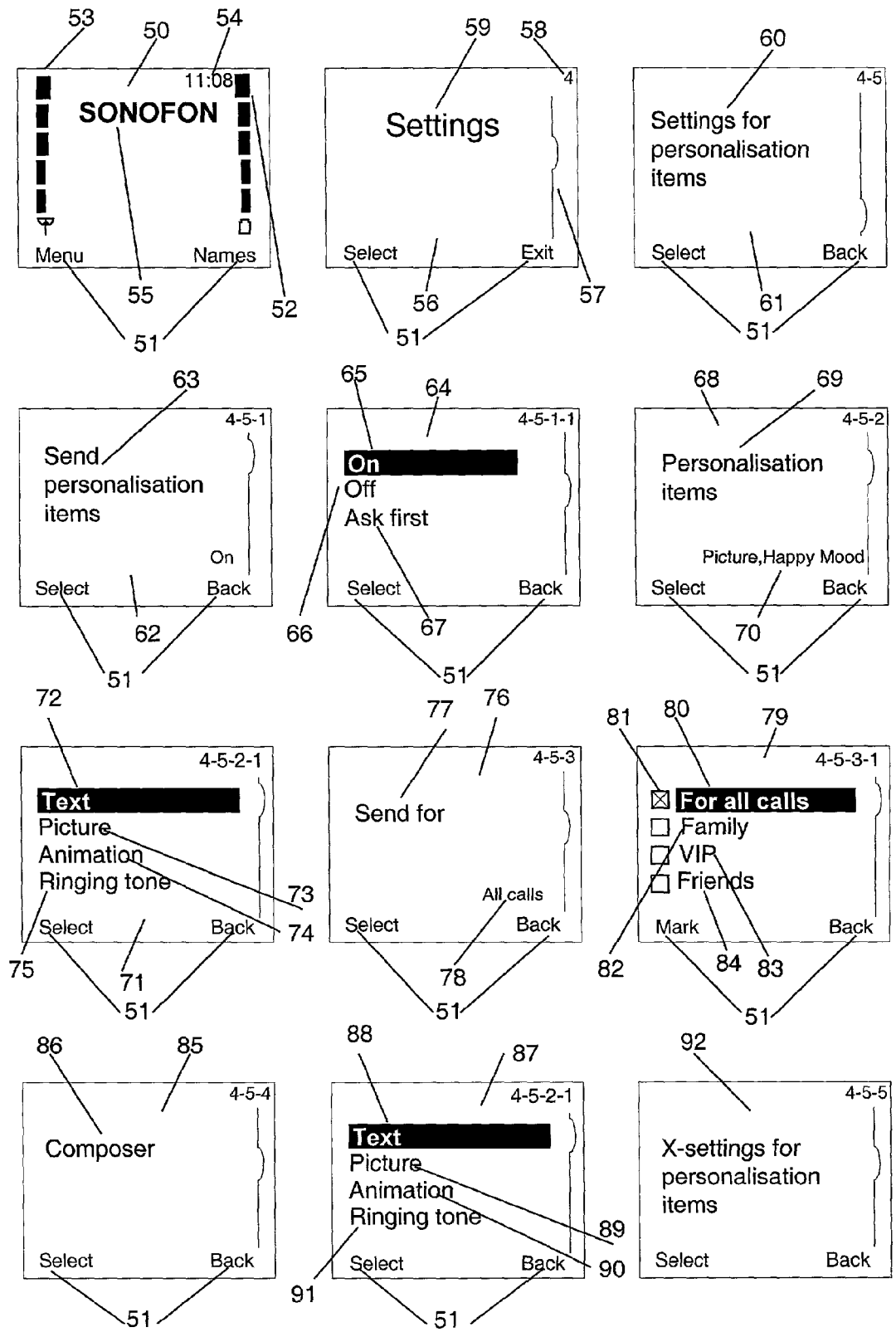
FIGS. 5a-8 show different windows of the display of a communication terminal having the functionality of handling personalisation items according to the invention.

In FIG. 5*a* is shown an idle display 50 for the communication terminal or phone 1, which includes two bars indicating the signal strength 53 and the battery level 52. Furthermore there is a time indication 54, an identification 55 of the operator or the network to which the phone 1 is presently connected, and two labels 51 indicating the present functionality (Menu: access to the Menu structure; Names: access to the Phone book) of the two soft-keys 9.

In idle mode the user can select the functions by pressing the left soft-key 9 "Menu" (shown in FIG. 5*a*) and scroll down with the navigation-key 10 until display 3 indicates "Settings", like in display 56 in FIG. 5*a*. This display includes a header 59 indicating the mode of the display ("Settings"), a menu-level indication 58 in the upper right corner and a picture (not shown) displaying a picture or the like that describes the function of the display menu. The menu-level indication 59 indicates the specified number of the menu currently being shown and can be used to jump directly to that menu without scrolling in the menus with the navigation-key 10. Display 56 also includes an indicator line 57 in the display's right part that indicates with a bend on the line that this menu is one of several other menus on this menu level. It corresponds to the last digit of the menu-level indication 59.

By pressing the left soft-key 9, "Select", when display 56 "Settings" is shown, the Settings function is activated, step 201, and a display will appear indicating a first sub-menu for settings. If the right soft-key 9, "Exit", is pressed instead, step 299, the communication terminal is brought back to idle mode (idle mode display 50), FIG. 5. By scrolling down with the navigation-key 10 another sub-menus for different settings will be indicated in the display. One of these sub-menus is display 61 that indicates with a header 60, "Settings for personalisation items".

By pressing the left soft-key 9, "Select", when display 61 "Settings for personalisation items" is shown, the settings function for the personalisation items is activated, step 202, and a display 62 will appear indicating with a header 63 a first setting, "Send personalisation items", for the function. This setting can be changed by pressing the left soft-key 9, "Select", step 203, and the available options for the first setting will be shown in display 64. The available options as shown in display 64 are "On" 65, "Off" 66 and "Ask first" 67 for the functionality of sending a personalised items as standard at each call set-up. One of the options will be highlighted to indicate, which option is executed by pressing the left soft-key 9 "Select". After executing or selecting any of the options by scrolling with the navigation-key 10 and/or pressing left soft-key 9 will the communication terminal be brought back to display 61. In most sub-menus the right soft-key 9, "Back", can be pressed and brings the communication terminal back to the present menu-level.

If instead the navigation-key 10 is used to scroll down from display 61, a display 68 will appear indicating with a header 69 a second setting, "Personalisation items", for the function. This setting is used to select a certain personalisation item that is going to be used for sending as default item when the function is turned on. In display 68 it is indicated with a second header 70 the type of personalisation item and the name of the selected item. This setting can be changed by pressing the left soft-key 9, "Select", step 204, and the available personalisation items types for the second setting will be shown in display 71. The available types of personalisation items as shown in display 71 are "Text" 72, "Picture" 73, "Animation" 74 and "Ringing tone" 75. By selecting one of the functions, the selected personalised item will be set as standard for each call set.

The first type in display 71 is "Text" 72, which is executed by pressing the left soft-key 9 "Select". By pressing the up/down navigation-key 10 the other possible types: "Picture" 73, "Animation" 74 and "Ringing tone" 75, will be accessible and highlighted on the display instead of "Text". By selecting or executing the first type "Text" 72, a display 114 will appear indicating a list of different text options that can be chosen as a default personalisation item. By pressing the left soft-key 9, "Option", a display 134 (see FIG. 6) will appear indicating some options (Select 135, View 136, Edit 137 and Erase 138) that are available for handling the personalisation item. Naturally there could be other options as well. Any of the options can be selected by pressing the left soft-key 9, "Select". If the first option "Select" 135 is selected, the communication terminal will be brought back to display 71 and the selected personalisation item will used by default.

If the second option "View" 136 is selected, the text item will be displayed in full in a new display (not shown). This display can be left by pressing the right soft-key 10 "Back" and the communication terminal will be brought back to display 114.

If the third option "Edit" 137 is selected, the text item will be displayed in full in an edit display (not shown), where the text can be edited. The navigation-key 10 is used to move backward and forward, the right soft-key 9 "Clear", to erase text, the keypad 7 to enter new text and the left soft-key 9, "Ready" to finish the editing and returning to display 114.

If the fourth option "Erase" 138 is selected, the text item will be erased, but before a confirmation display (not shown) will be displayed asking the user to confirmation the deletion of the text item. The confirmation is executed by pressing the left soft-key 9, "OK", whereafter the communication terminal is brought back to display 114. If instead the right soft-key, "Back", is selected the communication terminal will be brought back to display 134.

By scrolling down with the navigation-key 10 in display 71 and pressing the left soft-key 9 "Select", a second type of personalisation items, "Picture" 73 is selected, and a display 124 will appear indicating a list of different pictures 125-128 that can be chosen as default personalisation item. The picture items can be handled similar to the way that the text items earlier have been described in connection with display 134 in FIG. 6.

By scrolling further down with the navigation-key 10 in display 71 and pressing the left soft-key 9 "Select", a third type of personalisation item, "Animation" 74 is selected, and a display 119 will appear indicating a list of different animations 120-123 that can be chosen as default personalisation item. The animation items can be handled similar to the way that the text items earlier have been described in connection with display 134 in FIG. 6.

By scrolling even further down with the navigation-key 10 in display 71 and pressing the left soft-key 9 "Select", a fourth type of personalisation item, "Ringing tone" 75 is selected, and a display 129 will appear indicating a list of different ringing tones 130-133 that can be chosen as default personalisation items. The ringing tone items can be handled similar to the way that the text items earlier have been described in connection with display 134 in FIG. 6.

If the scrolling down with the navigation-key 10 is continued from display 61 after display 68 another display 76 will appear indicating with a header 77, a third setting, "Send for", for the function. This setting is used to select to which receivers the personalisation item is going to be sent. In display 76 it is indicated with a second header 78 to which receivers the personalisation item is going to be sent. This setting can be changed by pressing the left soft-key 9, "Select", step 205, and the available receiver groups for the third setting be will displayed in display 79. In display 79 is shown a couple of receiver groups 81-84 having a box 81 in front of them that can be checked to indicate that the receiver group located beside the box should be in included as default receiver of the personalisation item. The box is checked by pressing the left soft-key 9. When a box 81 has not been checked and is highlighted will the header 51 of the left soft-key will indicate "Mark" and when it already has been checked will the header 51 will indicate "Unmark" for the left soft-key 9. By pressing the right soft-key 9 "Back", the selection of receiver groups will be executed with a confirmation display (not shown) where the changes are accepted by pressing the left soft-key "Yes" whereafter the communication terminal is brought back to display 76. If instead the changes are rejected by pressing the right soft-key "No", the communication terminal will return to display 79 for further changes.

If the scrolling down with the navigation-key 10 is further continued from display 68 after display 76, yet another display 85 will appear indicating with a header 86 a fourth setting, "Composer", for the function. This setting is used to create a new personalisation item that can be used. The composer can by pressing the left soft-key 9, "Select", step 206, and a display 87 with a list of the available personalisation items 88-91 that can be created are shown. Each of the personalisation item types can be selected for creating new ones by scrolling down with the navigation-key 10 and/or pressing the left soft-key 9 "Select". This will bring the communication terminal to an edit menu (not shown) where the different types of personalisation items 88-91 can be created. After creating a new personalisation, items are saved and the communication terminal is brought back to display 85 by pressing the left soft-key 9. The new personalisation items can be used as default item by entering into display 68 and selecting the new item in the menus.

In FIG. 5*a* is yet another setting display 92 indicating that the settings are only examples of possible settings and that many other variants of settings can be used.

Figure 5B:
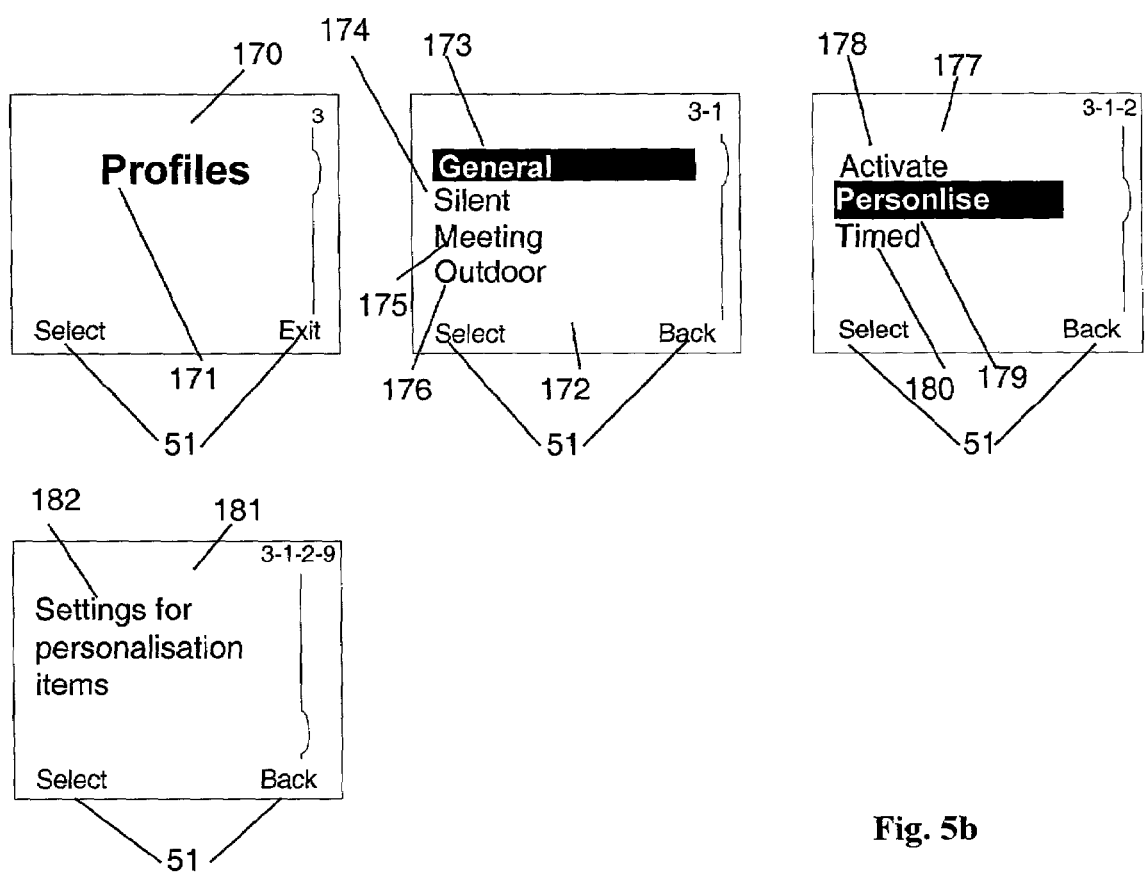

As mentioned earlier, the operational settings for the personalisation items functionality can also be adjusted differently for the operational modes or profiles. In FIG. 5*b* are shown a couple of displays describing this. In idle mode (display 50) the user can select the functions as earlier described by pressing the left soft-key 9 "Menu" (shown in FIG. 5*a*) and scroll down with the navigation-key 10 until display 3 indicates "Profiles", like in display 170 in FIG. 5*b*. This display includes a header 171 indicating the mode of the display ("Profiles"), a menu-level indication, in the upper right corner, a picture (not shown) displaying a picture or the like that describes the function of the display menu, and an indicator line in the right part of the display that indicates with a bend on the line that this menu is one of several other menus on this menu level.

By pressing the left soft-key 9, "Select", when display 170 "Profiles" is shown, the settings function for the profiles is activated, step 210, and a display 172 will appear indicating a list of profiles 173-176. There could be more profiles than shown in display 172. Each of the profiles 173-176 can be selected by scrolling down with the navigation-key 10 and pressing the left soft-key 9, "Select" when a profile is highlighted. When a profile is selected, a display 177 will appear, step 211, indicating different options 178-180 of how the selected profile can be handled. The first option 178 "Activate" is used to execute the selected profile. The first option is executed by pressing the left soft-key 9 "Select", whereafter the communication terminal is brought back to idle mode, display 50, and where a header (not shown) appears in the display indicating the name of the selected profile. The second option 179, "Personalise", is used to set the different settings of the profile: ringing tone, ringing volume, name of the profile, vibra alert, screen saver etc. By pressing the left soft-key 9, "Select", step 212, when the second option 179 is highlighted, a display (not shown) will appear with a first setting of the profile. By scrolling down with the navigation-key 10 and passing different other settings for the profile, a display 181 "Settings for personalisation items" will soon appear. The setting for personalisation items can be changed by pressing the left soft-key 9 "Select", step 201. This has earlier been described in connection with the general operational settings.

Another alternative is that it should be possible to set for a number of the phonebook 23 that personalisation items should be accepted or rejected as a default. It can also be possible to set that personalisation items should only be accepted if the calling line identification (CLI) is present.

Figure 6:
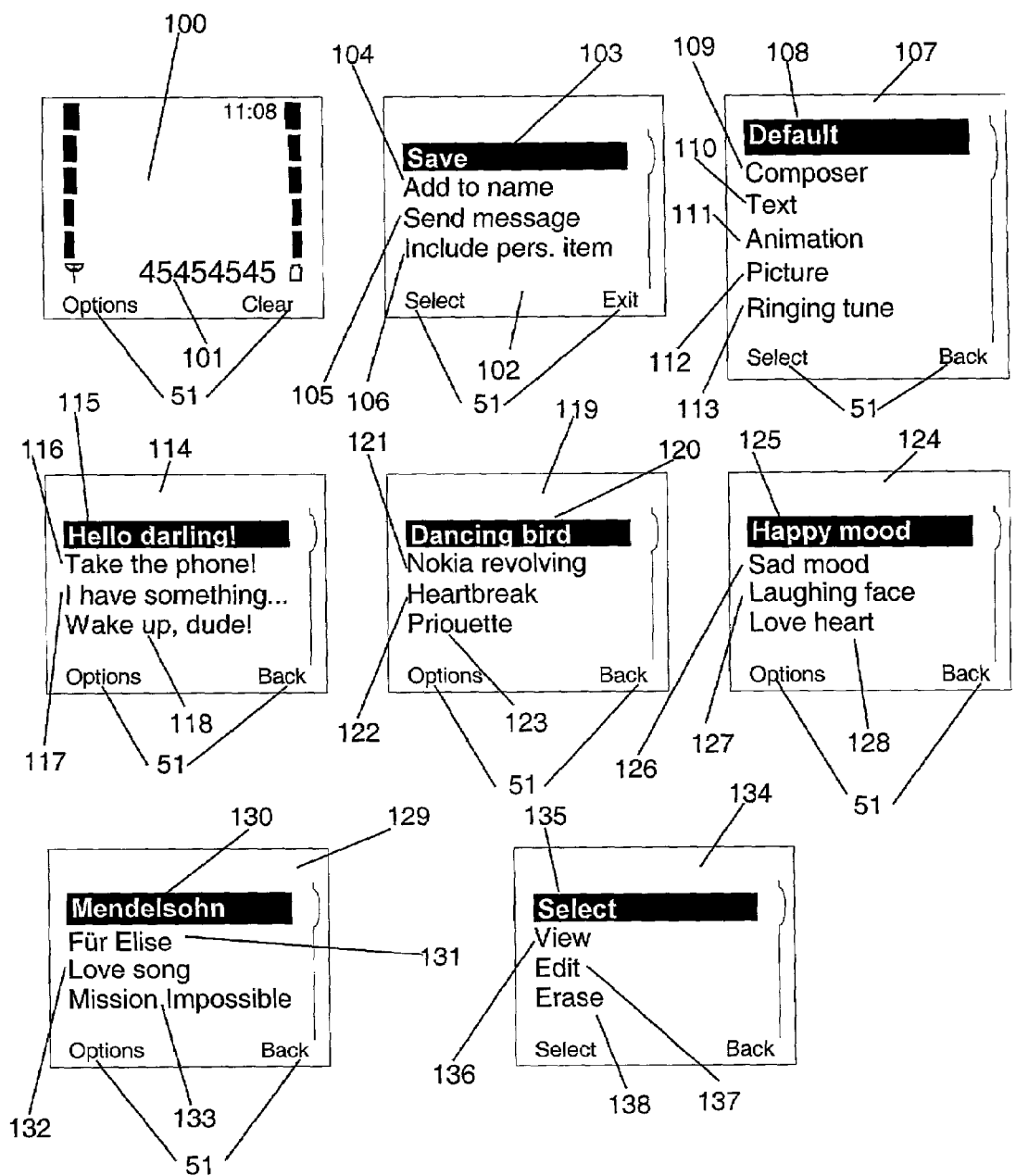
Figure 7:
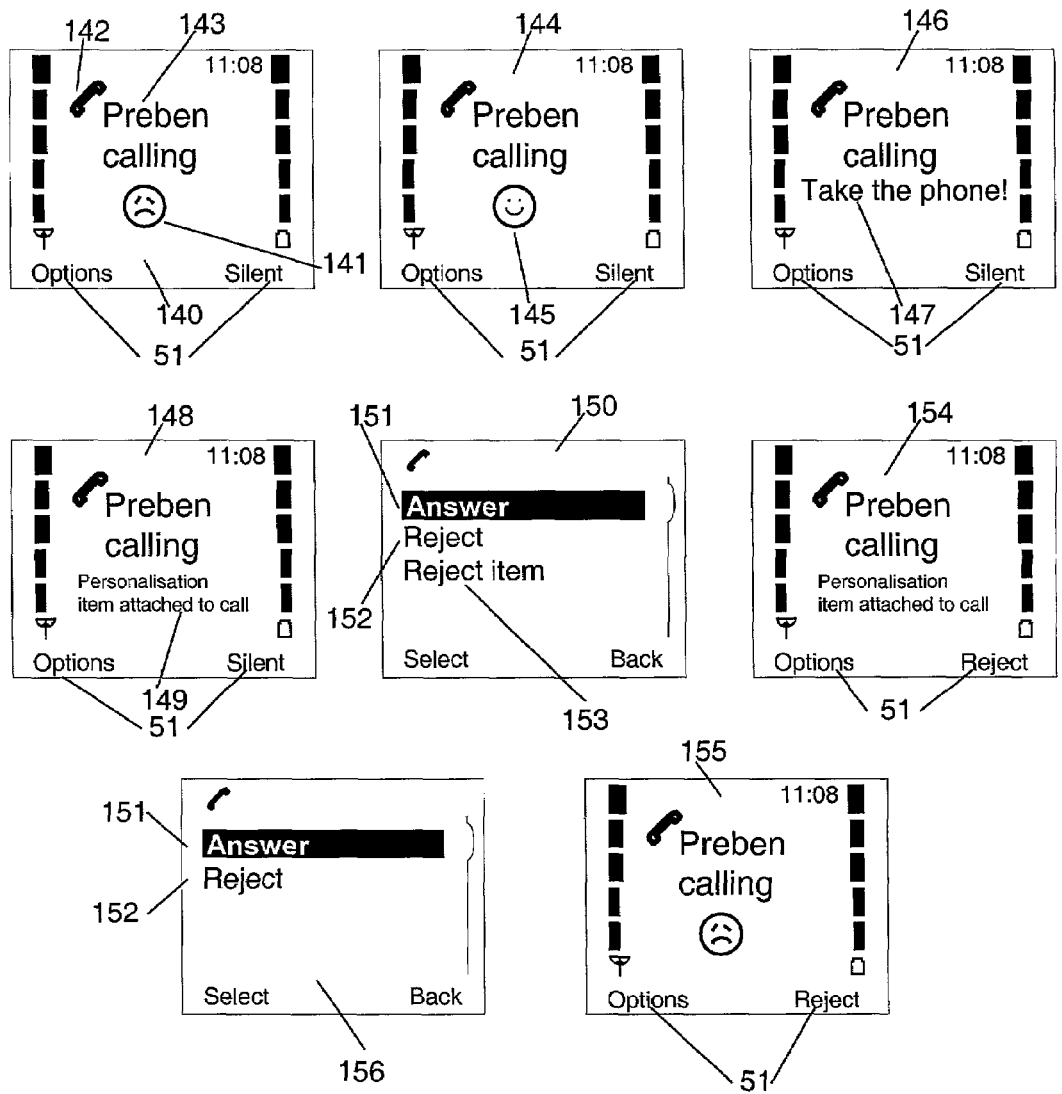
Figure 8:
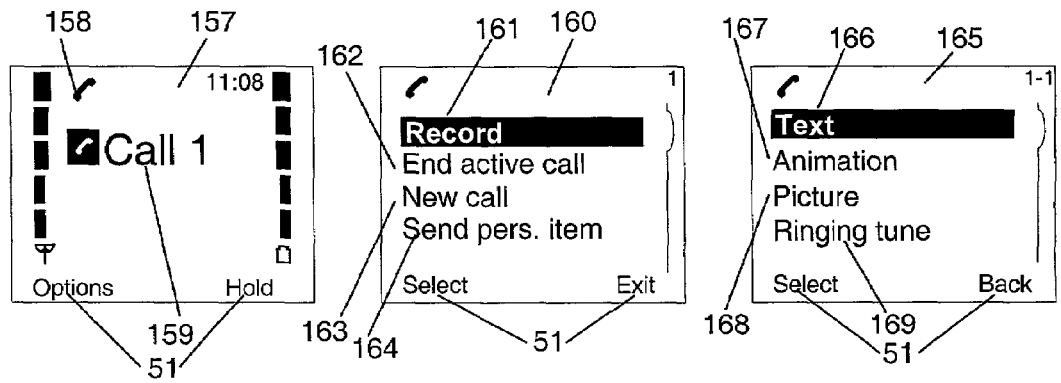
Figure 9A:
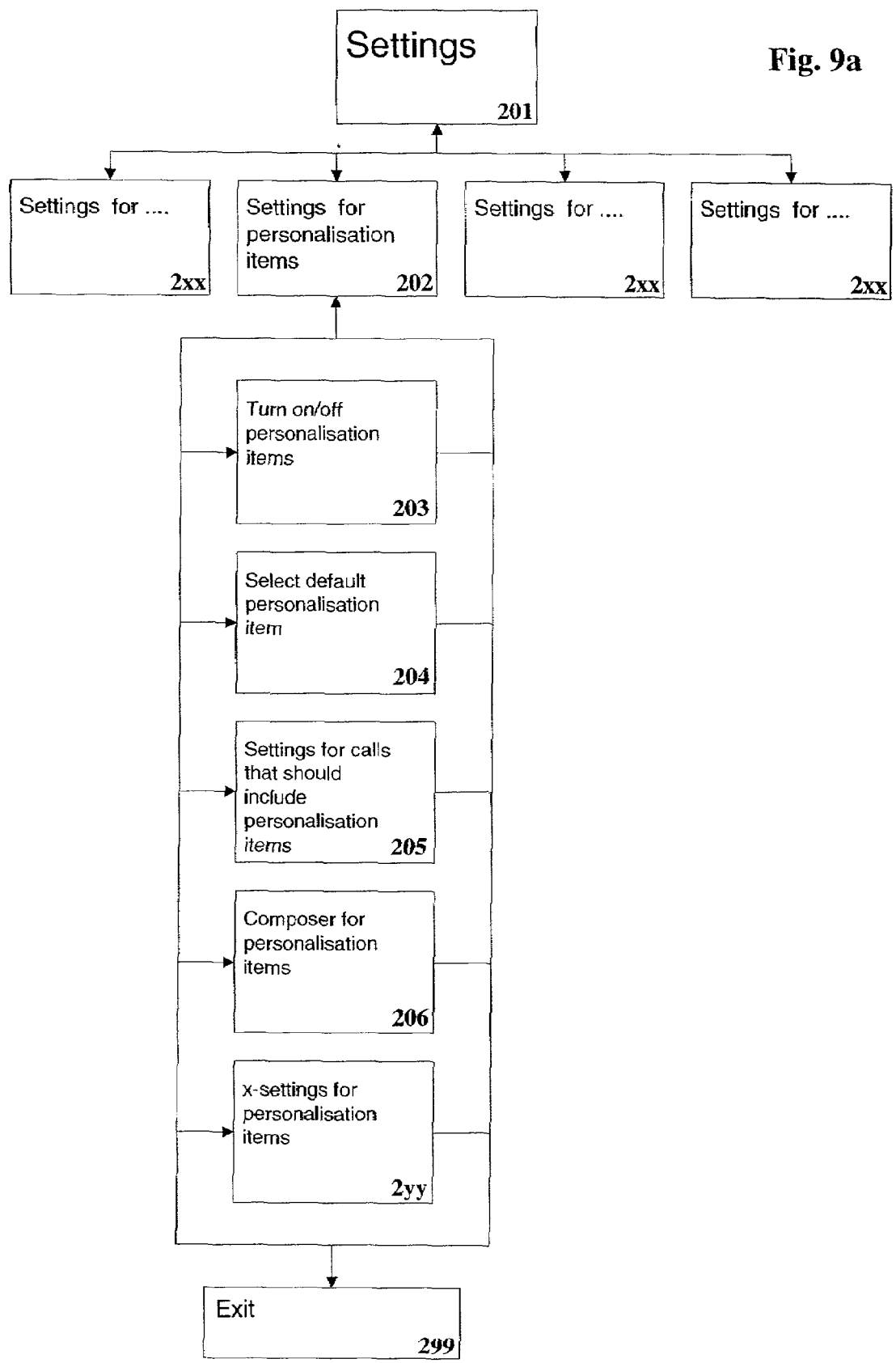
FIGS. 9a-9b show flow charts of operational settings of the personalisation items functionality according to the invention.
Figure 9B:
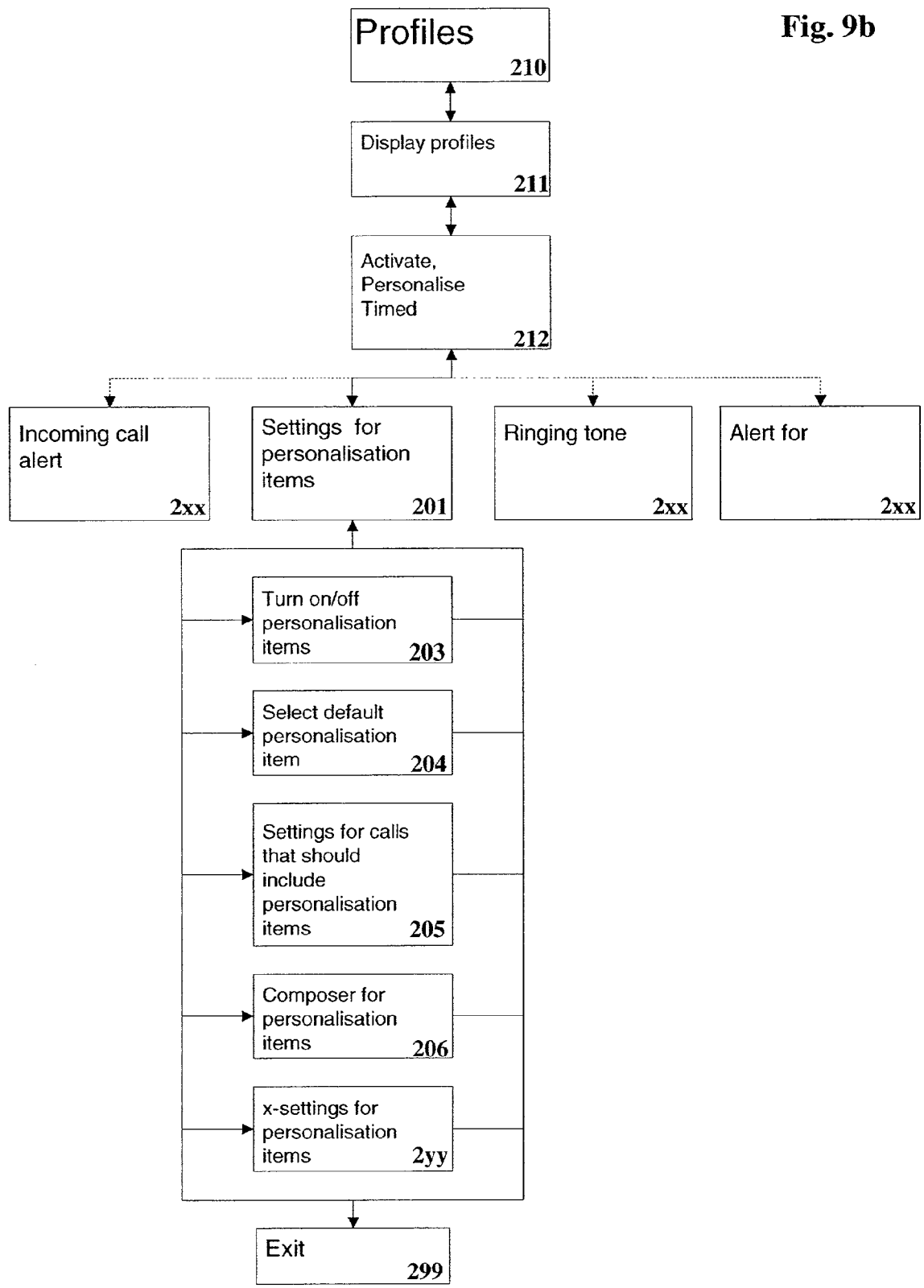
Figure 10:
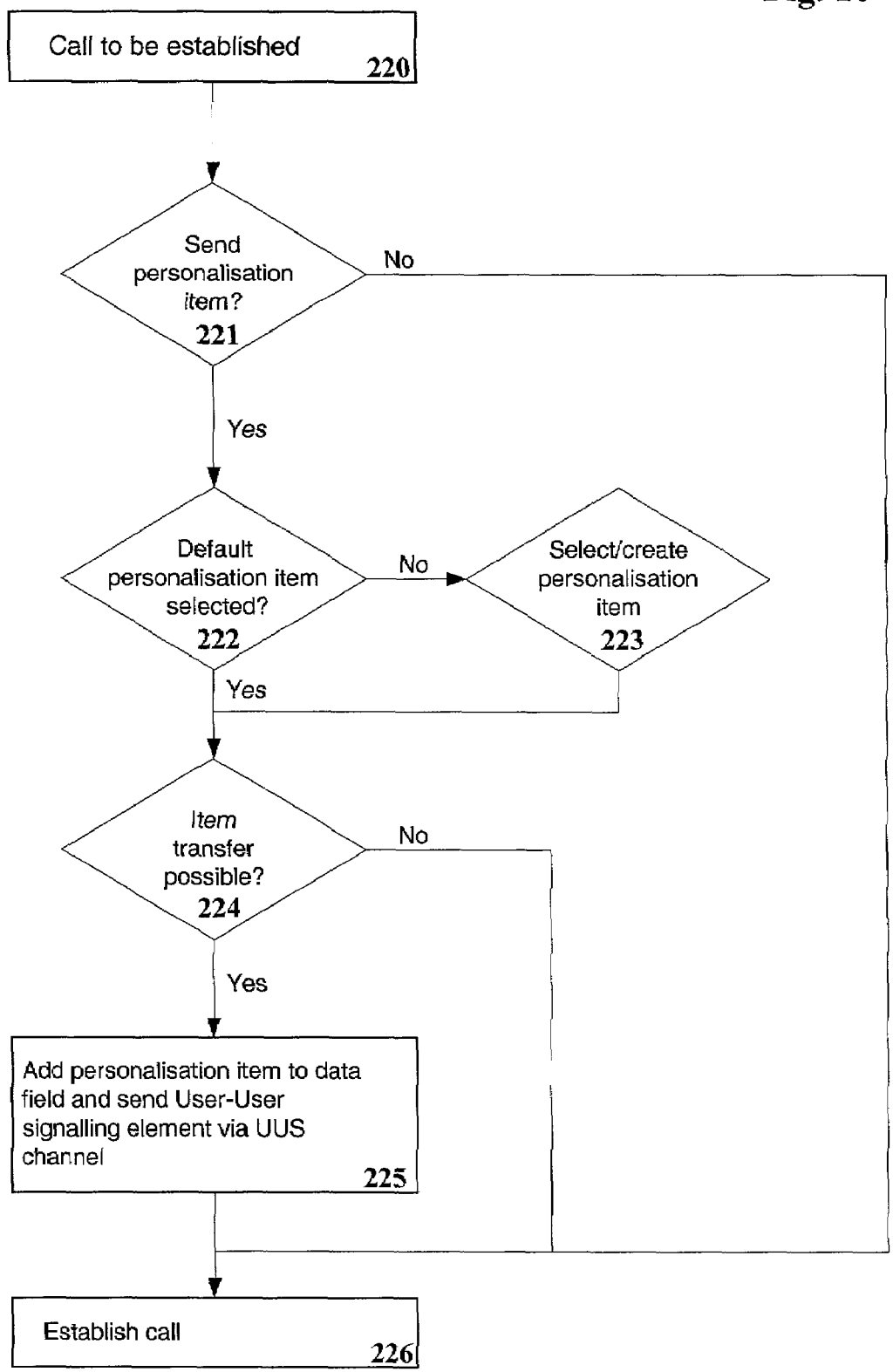
FIG. 10 shows a flow chart of handling call set-up with the personalisation items functionality according to the invention.
Figure 11:
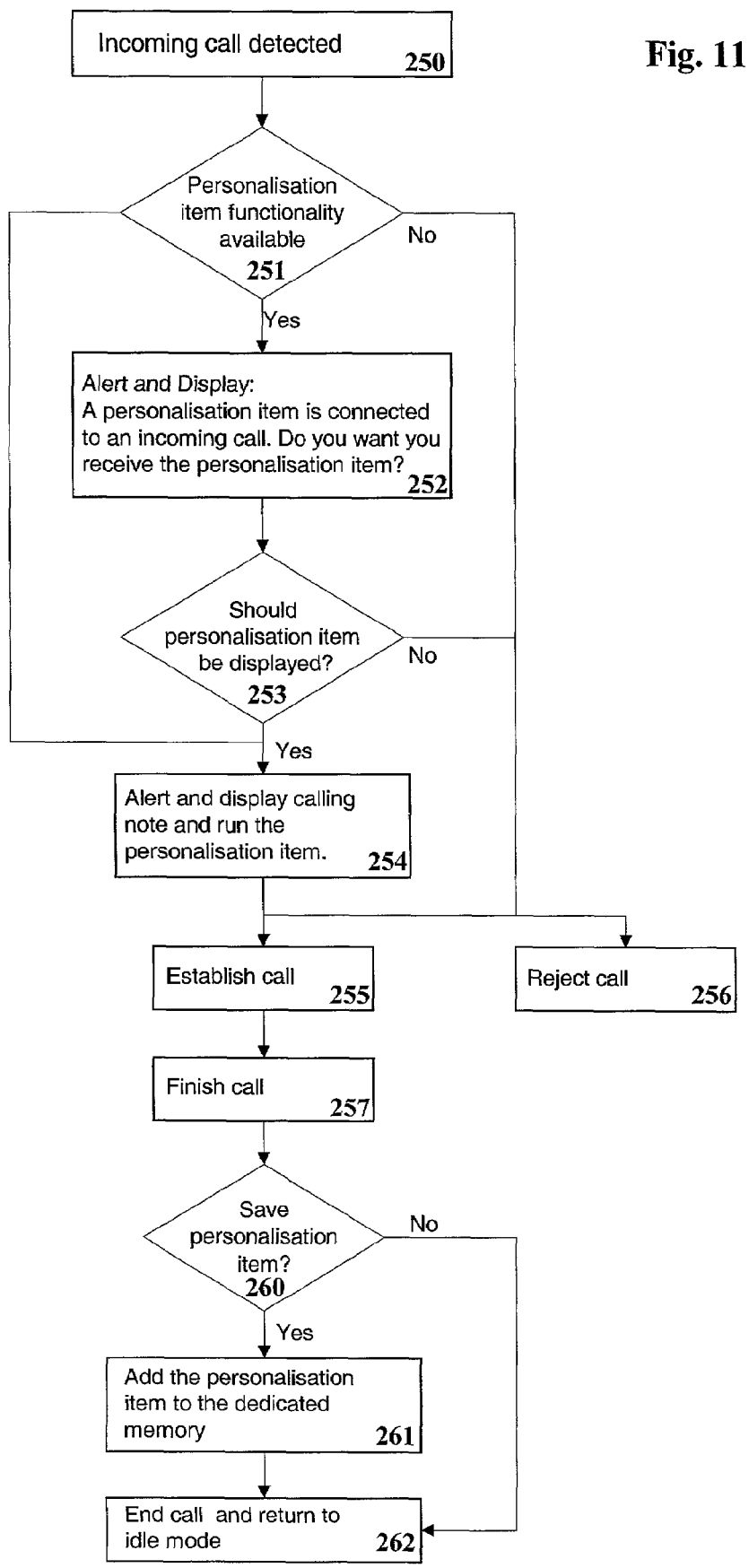
FIG. 11 shows a flow chart of handling an incoming call with the personalisation items functionality according to the invention.
Figure 12:
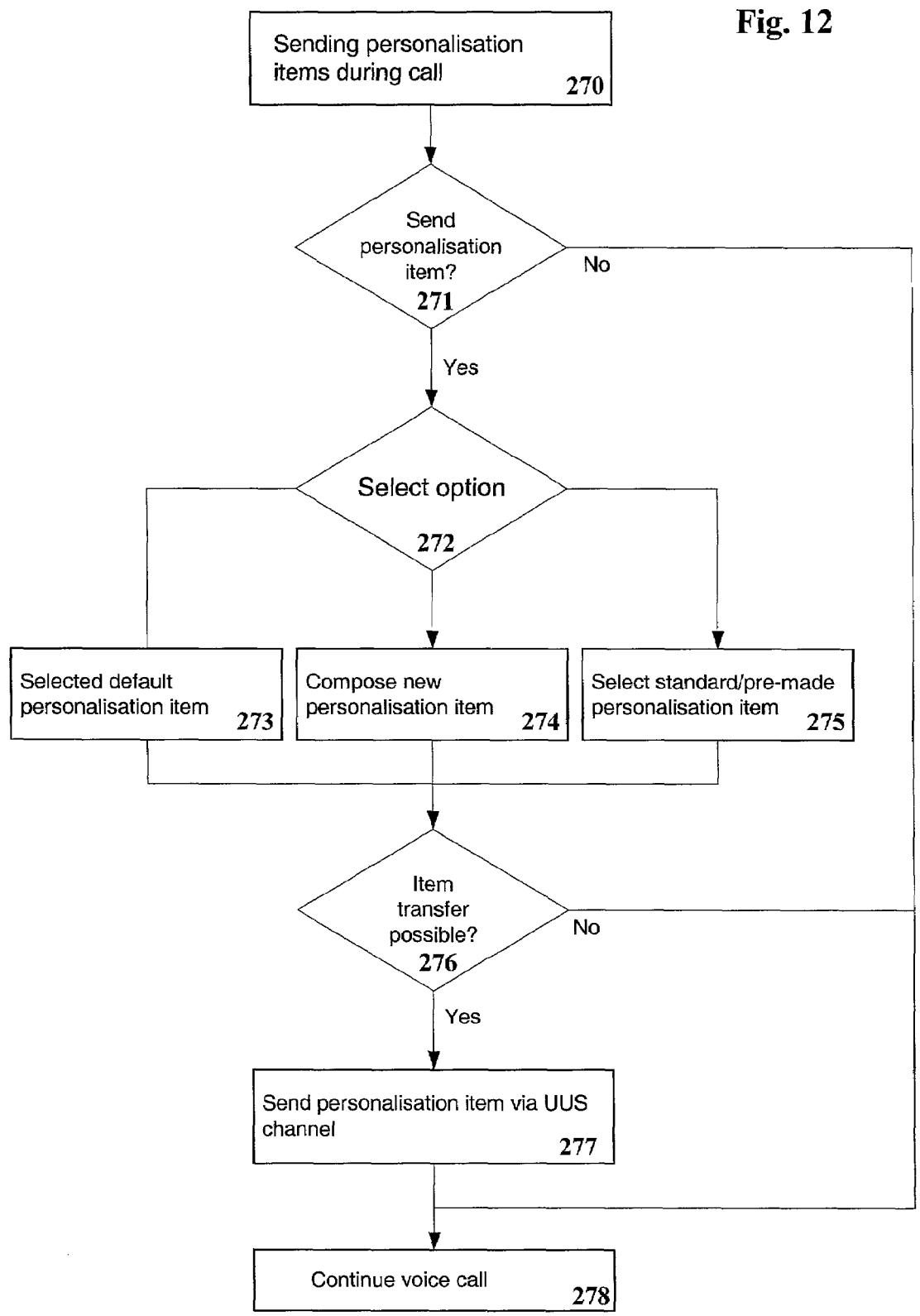
FIG. 12 shows a flow chart of sending a personalisation item during a call according to the invention.

Now the invention will be described in connection with a call set-up, during a call and for an incoming call. Reference will be made to FIGS. 6-8 and the flow charts in FIGS. 10-12.

Starting from idle mode (display 50 in FIG. 5*a*) the user enters the phone number of the receiver that to be called by using the numerical keys 8. An example of an entered phone number 101, step 220, is shown in display 101 (see FIG. 6). After one digit has been entered, the label 51 indicating the present functionality of the left-soft-key 9 is changed from "Select" to "Options", and the label 51 indicating the present functionality of the right soft-key 9 is changed from "Names" to "Clear". After the phone number 101 has been entered, the user can press the left call handling key 12 to make the call, press the right call handling key 12 to erase all digits entered in one press and return to idle mode, press the right soft-key 9 "Clear" to erase one digit at a time or press the left soft-key 9 "Options" and a display 102 will appear with different options 103-106 how to use the entered phone number 101. There are more options than shown in the display 102, but the options shown have been limited to a couple to make it more perspicuous. By scrolling down with the navigation-key 10, the fourth option 106 "Include pers. Item" can be highlighted and selected by pressing the left soft-key 9 "Select", step 221. A display 107 will appear including a selection of personalisation items 108-113 that can be included in the call set-up. The first item 108 "Default" is the item that has been chosen as default personalisation item for that profile or as a general personalisation item for all modes or profiles. How this default personalisation item has been chosen has earlier been described in connection with the operational settings. If the first item 108 "Default" is selected, step 222, by pressing the left soft-key 9 "Select", the communication terminal will return to display 102. The call set-up process can be started by scrolling down/up in the menu until the "Call" alternative is highlighted and pressing the left soft-key 9 "Select" or pressing the left call handling-key 12. The communication terminal checks with the network that it supports User-User signalling, step 224, and adds the personalisation item to the data field of the UUS element and sends the UUS element via the UUS channel, step 225. When the UUS element is transferred to the receiver and the call set-up is finished the call is established, step 226.

If other than the default personalisation item is preferred, the navigation-key 10 is used to scroll down until any of the other items 109-113 is highlighted and select the preferred item by pressing the left soft-key 9 "Select", step 223. If a new personalisation item is preferred, the item 109 "Composer" should be selected and a display similar to display 87 will appear and a new personalisation item can be created. How a new personalisation item can be created has earlier been described in connection with the composer in the operational settings. After the new personalisation item has been created the communication terminal will return to display 102. The call set-up process can be started as described above for the default item 108. If a text item 110 is wanted display 114 will appear after item 110 "Text" has been selected in display 107. Display 114 includes a list of different standard or pre-made text items 115-118. More text items can be shown if the navigation-key 10 is used to scroll down in the list. A preferred text item 110 is highlighted with the navigation-key 10 and selected by pressing the left soft-key 9 "Options". After the selection a display 134 will appear with some options of ("Select" 135, "View" 136, "Edit" 137 and "Erase" 138) how the selected text item can be handled. How these options works has earlier been described in connection FIGS. 5*a* and 5*b* and the operational settings. After the text item has been handled and selected the communication terminal will return to display 102. The call set-up process can be started as described above for the default item 108 and the composer item 109. If any of the "Animation" item 111, the "Picture" item 112 or the "Ringing tone" item 113 is selected a procedure similar to the one for the "Text" item 110 will be repeated.

According to the part describing the settings, the personalisation items functionality can have at least operations, e.g. "On", "Off" and "Ask first". With the "Off" setting personalisation item will not be sent or received by the communication terminals. If a personalisation item is sent by a first communication terminal, but not accepted or received by the second communication terminal, the first communication terminal will be notified that the personalisation item was not received by the second communication terminal.

When a communication terminal with the "Ask first" setting detects an incoming call, step 250, and when a personalisation item is attached to the call, the communication terminal will check if the receiving terminal has the personalisation item functionality available, step 251. If the functionality is available, an alert note 149 "Personalisation item attached to call" will be shown in the display 148, step 252. If the personalisation item functionality is not available, the incoming call will be alerted in the normal way. The alert note 149 informs the called user that a personalisation item is attached to the call and it can be displayed if desired. By pressing the left soft-key 9 "Options" the different options 151-153 can be shown in display 150. The first option 151

"Answer" means that the personalisation item is accepted and performed, step 254, and the call is established, step 255. It is executed by pressing the left soft-key 9 "Select". Examples of performed personalisation items 141, 145 and 147 are shown in display 140, 144 and 146. Picture 140 also includes a header 143 indicating the calling person if the calling line identification (CLI) is present, a phone icon 142 indicating that the terminal is in call mode. If instead the right soft-key 9 "Back" is pressed while being in display 150, the communication terminal be brought to display 154 having another header indication 51 for the right soft-key 9 compared with display 148. If the second option 152 "Reject" is selected, the call set-up is ended, step 259. When the third option 153 "Reject item" is selected, the incoming call will be accepted and established, step 255, but the personalisation item will not be displayed. After a call has been finished, step 257, the receiver will be given the opportunity, step 260, to save the received personalisation item in a dedicated memory, step 261. After this, the communication terminal is brought back to idle mode, step 262.

In an alternative embodiment, the receiver of the personalisation item should have the opportunity to also inspect the personalisation item prior to accepting the transferred personalisation item and answering the call.

When a communication terminal with the "On" setting detects an incoming call, step 250, and when a personalisation item is attached to the call, the communication terminal will check if the receiving terminal has the personalisation item functionality available or not, step 251. If the functionality is available the communication terminal will perform the personalisation item, step 254 otherwise the incoming call will be alerted in the normal way. Examples of performed personalisation items 141, 145 and 147 are shown in display 140, 144 and 146. The user of the communication terminal has the normal options to "Answer" 151, step 255, or to "Reject" 152 the call, step 256, as shown in display 156. Display 156 is accessed by pressing the left soft-key 9 "Select". If instead the right soft-key 9 "Back" is pressed while being in display 156 the communication terminal will be brought to display 155 having another header indication 51 for the right soft-key 9 compared with displays 140, 144 or 146. After a call has been finished, step 257, the receiver will be given the opportunity, step 260, to save the received personalisation item in a dedicated memory, step 261. After this the communication terminal is brought back to idle mode, step 262.

In FIG. 8 is shown a display 157 when a call is established and in progress. The display also includes a header 159 indicating what call is in progress and a phone icon 158 indicating that the terminal is in call mode. The right soft-key 9 "Hold" can be used for putting the call on hold. By pressing the left soft-key 9 "Options" will a display 160 will appear indicating a list of different options 161-164. There could more options available if the navigation-key 10 is used to scroll down the list, but to make it more apparent the display 159 has been limited to the options shown. By scrolling down in the list the "Send pers. Item", option 164 can be highlighted. When pressing the left soft-key 9 "Select" and thereby selecting the "Send pers. Item" option 164, step 271, a display 165 will appear, step 272, with a list of the different personalisation item types. There could naturally be more options like default or composer as shown in display 107 (see FIG. 6). By scrolling up/down with the navigation-key 10 in the list the a preferred option can be highlighted and by pressing the left soft-key 9 "Select" the preferred option can be selected, step 273 (default personalisation item), step 274 (compose a new personalisation item) and step 275 (select standard/pre-made personalisation item). The communication terminal checks with the network that it supports User-User signalling (UUS), step 276, and adds the personalisation item to the data field of the UUS element and sends the UUS element via the UUS channel, step 277. When the UUS element is transferred to the receiver and a confirmation notification has been displayed in the display (not shown), the communication terminal is brought back to display 157, step 278. If the network does not support User-User signalling, a notification will be displayed (not shown) in the display and the voice call is continued, step 278.

A received personalisation item can be saved in dedicated memories of the receiving terminal as previously mentioned. For example a ringing tone received as a personalisation item can be assigned a calling line identification (CLI) ringing tone to the caller's phone number in the phonebook of the receiving communication terminal. Another example is that a picture or icon received as a personalisation item can be assigned as a calling line identification (CLI) icon to the caller's phone number in the phonebook.

Except the earlier examples of text messages, pictures, animation or ringing tones should be noted that any item suitable for increase the personalisation of the communication terminal and possible to send in parallel with call could be included as personalisation item. Examples of other items are logos, business cards, etc.

The invention is not limited to the above-described examples or to the drawings showing examples of an embodiment, but can be varied within the scope of the appended claims. For example a communication terminal having only two soft-keys has been shown and described, but it is obvious that communication terminals having one, three or more soft-keys can also be provided with the functionality of handling personalisation items according to the invention. The displays of the communication terminal are changed to suit the invention.

What is claimed is:

1. A method for enabling a user to transmit items including at least one personalization item selected by the user from a first communication terminal to a second communication terminal while the communication terminals are in a call set up mode with each other comprising the steps:

storing the at least one personalization item selected by the user in the first communication terminal prior to the call set up mode and which is transmitted when the user calls the second communication terminal from the first communication terminal so that the at least one personalization item may be stored by the second communication terminal for future use in communication with the user at the first communication terminal;

setting the first terminal to automatically retrieve the stored at least one personalization item selected by the user upon an initiation by the user to make a call to the second terminal from the first communication terminal;

automatically transmitting during the call set up mode, the retrieved stored at least one personalization item from the first communication terminal to the second communication terminal; and the second communication terminal includes a plurality of user options for handling receiving of items from other terminals and the second communication terminal upon receiving of the at least one personalization item from the first communication terminal verifies the user options for receiving of the items and receives the at least one personalization item transmitted from the first communication terminal in accordance with the user options and stores the at least one personalization item for future use in communication with the user at the first communication terminal,
wherein one of the plurality of user options comprises confirming with the user of the second communication terminal whether or not to use the transmitted at least one personalization item with respect to the call.

2. A method according to claim 1, wherein:
the at least one personalization item from the first terminal is displayed on a display of the second communication terminal.

3. A method according to claim 1, wherein:
the at least one personalization item from the first terminal is played by the second communication terminal.

4. A method according to claim 1, wherein:
the at least one personalization item from the first terminal is stored in a memory of the second communication terminal and the at least one personalization item from the first terminal is deletable from the memory.

5. A method according to claim 1, wherein:
the at least one personalization item from the first terminal is assigned as a calling line identification (CLI) ringing tone for a phone number of the first terminal which is stored in the second terminal.

6. A method according to claim 1, wherein:
the at least one personalization item from the first terminal is storable as a calling line identification (CLI) icon that is transferred to the second communication terminal connected to the calling line identification of the first terminal.

7. A called communication terminal for handling receiving of information including at least one personalization item which is stored in a memory of a calling terminal prior to a call set up mode and which is transmitted during a call set up mode when a user calls the called communication terminal from the calling communication terminal so that the at least one personalization item may be stored by the called communication terminal for future use in communication with the user at the calling communication terminal which, upon initiation by the user of the calling terminal to make a call to the called communication terminal retrieves the stored at least one personalization item from the memory and transmits the retrieved at least one personalization item to the called communication terminal comprising:
a processor, and
a process for handling the receiving of the transmitted at least one personalization item which is run by the processor, the process including a plurality of user options for handling the receiving of the at least one personalization item; and wherein
the user options comprise at least one user option providing a user of the called communication terminal with an opportunity to store the at least one personalization item for future use in communication with the user at the calling communication terminal, and the user options further comprising confirming with the user of the called communication terminal whether or not to use the transmitted at least one personalization item with respect to the call.

8. A communication terminal according to claim 7, wherein:
the at least one personalization item includes an electronic representation thereof and the at least one personalization is displayed, played or stored in the called communication terminal.

9. A communication terminal according to claim 7, wherein:
the at least one personalization item includes an electronic representation of a ringing tone, which upon request from a user of the communication terminal automatically stores the received ringing tone in a database of the communication terminal for setting the ringing tone as an alert signal for a phone number of the called communication terminal to be stored in a database of the called communication terminal.

10. A communication terminal in accordance with claim 7 comprising:
a memory which stores the received at least one personalization item.

11. A method for a called communication terminal to handle receiving of information including at least one personalization item which is stored in memory of a calling terminal prior to a call set up mode and which is transmitted when a user calls a called communication terminal from the calling communication terminal so that the at least one personalization item may be stored by the called communication terminal for future use in communication with the user at the calling communication terminal so that upon initiation by the user of the calling communication terminal to make a call to the called communication terminal retrieves the stored at least one personalization item from a memory of the calling communication terminal and transmits the at least one personalization item to the called communication terminal comprising:
a processor within the called communication terminal; and wherein
the processor runs a process for handling receiving of the transmitted at least one personalization item which is run by the processor, the process including a plurality of user options for handling the receiving of the at least one personalization item; and wherein
the user options comprise at least a user option causing the called communication terminal to store the at least one personalization item for future use by the called communication terminal in communicating with the user of the calling communication terminal, wherein one of the plurality of user options comprises confirming with the user of the called communication terminal whether or not to use the transmitted at least one personalization item with respect to the call.

12. A method in accordance with claim 11, wherein:
the at least one personalization item includes an electronic representation thereof which is displayed, played or stored in the called communication terminal.

13. A method in accordance with claim 11, wherein:
the at least one personalization item includes an electronic representation of a ringing tone, which upon request from a user of the communication terminal automatically stores the received ringing tone item in a database of the communication terminal for setting the ringing tone as an alert signal for a phone number of the called communication terminal to be noted in a database of the called communication terminal.

14. A method in accordance with claim 11 comprising:
a memory for storing the received at least one personalization item.

15. A computer program stored on a storage medium for use in a called communication terminal including a processor for handling receiving of information including at least one personalization item which is stored in a memory of a calling terminal prior to a call set up mode and which is transmitted when a user calls a calling communication terminal from the called communication terminal so that the at least one personalization item may be stored by the called communication terminal for future use in communication with the user at the called communication terminal which upon initiation by a user of the calling terminal to make a call to the called communication terminal retrieves the stored at least one personalization item from the memory and transmits the at least one personalization item to the called communication terminal which includes a processor, the computer program when executed causes the processor to perform the steps:

running a process for handling the receiving of the transmitted at least one personalization item, the process including a plurality of user options for handling the receiving of the at least one personalization item; and wherein the settings comprise at least one user option permitting the called communication terminal to store the at least one personalization item for future use by a user of the called communication terminal in communication with the calling communication terminal, wherein one of the plurality of user options comprises confirming with the user of the called communication terminal whether or not to use the transmitted at least one personalization item with respect to the call.

16. A computer program in accordance with claim 15 wherein:

the called communication terminal includes a memory and the computer program when executed causes the received at least one personalization item to be stored in the memory of the called communication terminal.

\* \* \* \* \*

UNITED STATES PATENT AND TRADEMARK OFFICE
CERTIFICATE OF CORRECTION

PATENT NO. : 7,286,821 B2  Page 1 of 1
APPLICATION NO. : 09/984608
DATED : October 23, 2007
INVENTOR(S) : Christian Kraft et al.

It is certified that error appears in the above-identified patent and that said Letters Patent is hereby corrected as shown below:

Title page, item [56] In References Cited:
  Please insert reference --6,330,461 12/2001 Andersson, H.ang.kan--

Title page, item [56] In References Cited:
  Please insert reference --6,408,063 6/2002 Slotte et al.--

In Column 13, Claim 7, Line 43:
  Please replace "terminal" with --terminal,--

In Column 13, Claim 7, Line 47:
  Please replace "processor, and" with --processor; and--

In Column 13, Claim 8, Line 65:
  Please replace "thereof and" with --thereof, and--

Signed and Sealed this

Sixteenth Day of September, 2008

JON W. DUDAS
*Director of the United States Patent and Trademark Office*